Nov. 22, 1932.        J. G. DUDLEY ET AL        1,888,312
METALLURGICAL PROCESS FOR THE MAKING OF FERROUS METALS
Filed Feb. 23, 1926
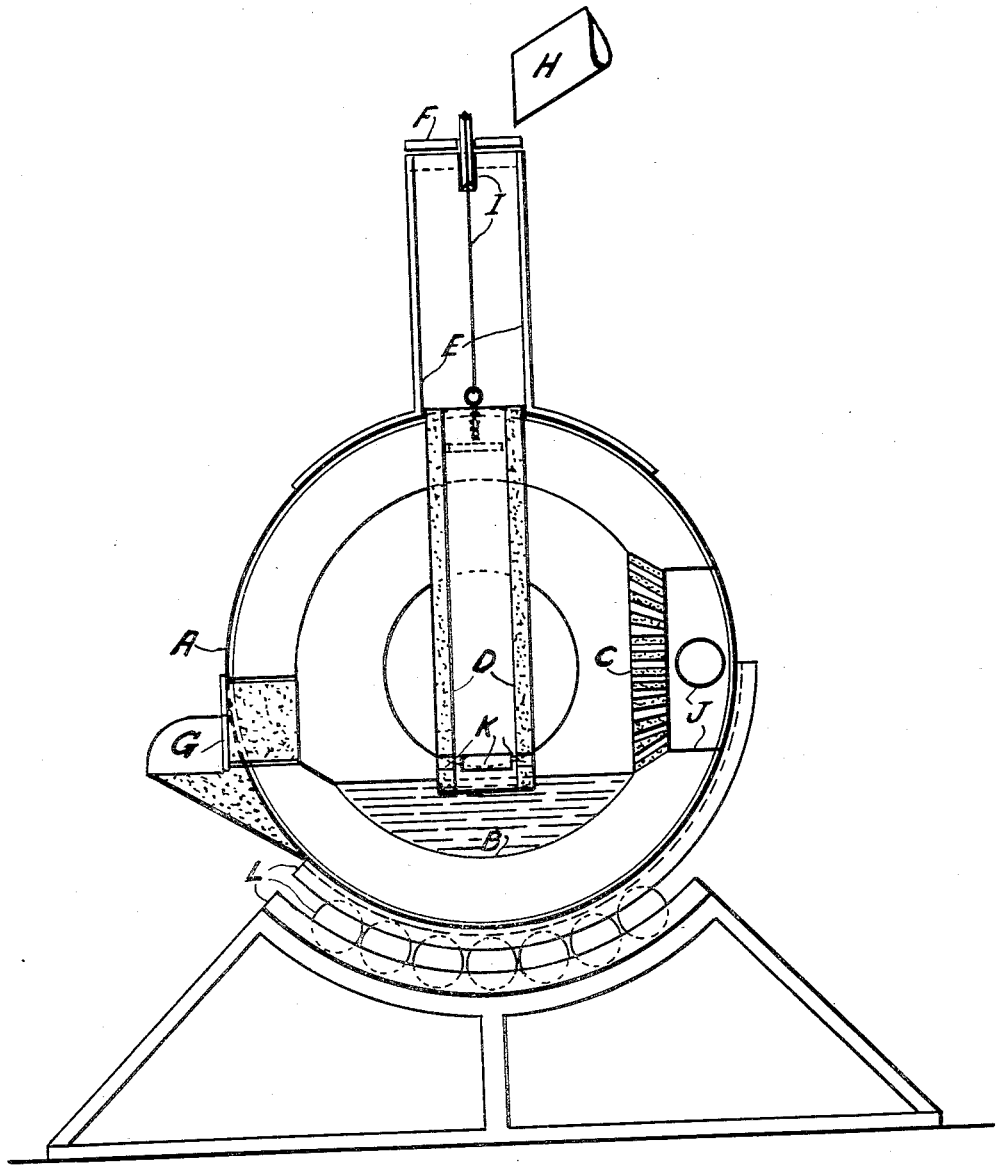

Patented Nov. 22, 1932

1,888,312

UNITED STATES PATENT OFFICE

JAMES G. DUDLEY AND JOHN G. KREER, OF BROOKLYN, NEW YORK, ASSIGNORS, BY MESNE ASSIGNMENTS, TO HARRISON OSBORNE, OF NEW YORK, N. Y.

METALLURGICAL PROCESS FOR THE MAKING OF FERROUS METALS

Application filed February 23, 1926. Serial No. 90,180.

Our invention relates to the smelting carried on preferably in a tiltable furnace having a melting hearth onto which the ore, or metal, or fuel, is charged, preferably through a refractory conduit open only at top and bottom for the gravity passage therethrough of the charge and having in addition a second hearth, equipped with tuyères and blast connections for refining the molten metal when transferred thereto by the tilting of the furnace through the requisite arc.

Our invention secures the melting by the conduction of the requisite heat through the refractory walls of the charging conduit to the ore or fuel contents thereof. The ore may be of any desired metalliferous composition, natural or artificial, combined with, or free from, beneficial ingredients for the quicker melting, or for the better chemical reactions of the charge thus encased out of direct contact with the heating medium derived from whatsoever source, or of whatever characteristics.

Our invention permits the step by step production of finished metal from ore in one continuous operation and may utilize the products of the primary blast furnace and its processes, and in addition may secure, in one multiplex-functioning structure, not only the results secured by the blast furnace coordinating separately with the open-hearth furnace or the converter, but other advantageous results not hitherto attainable, thus permitting the profitable use of metalliferous ores hitherto found unprofitable because of undesirable physical or chemical characteristics.

Among the objects of the invention are to reduce the thermal demands or heat requirements inhering in the conversion of the prepared ore into the finished metal, and to reduce the losses of the fines of metalliferous ore throughout the conversion process.

Another object of the invention is to reduce the time and cost of converting the prepared ore into the finished product and to reduce the amount of labor required in handling and preparing the ore for the conversion.

Another object of the invention is to reduce the overhead costs chargeable to construction and maintenance of apparatus for changing the prepared ore into metallic ingot or other suitable form of metallic product.

Another object of the invention is to reduce the consumption of power hitherto required to transport the ore or intermediate products in the conversion of the ore to the finished metal.

Another object of the invention is to reduce the ground area and space required in the conversion of ore to metal per ton of the product.

Another object of the invention is to reduce the rate of deterioration of the refractory linings employed in the production of metal from metalliferous ores.

Another object of the invention is to permit the production of purified iron oxide directly from the ore so as to be free from its gangue either in the molten or cast form as the initial stage in the production of ferrous metal.

Another object of the invention is to permit reduction of purified iron oxide free from its gangue to secure a predetermined composition of finished ferrous metal and to permit decarbonization of iron which has taken up more carbon than desired in the final product.

Other objects of the invention will be apparent from the following description of our invention.

Various features of our invention are illustrated in the accompanying drawing showing the preferred embodiment of our invention in which the figure is a sectional view in elevation of our apparatus.

Referring more particularly to the drawing, A is a combined melting and refining furnace which is tiltable through an arc of approximately 90° in a clockwise direction, and through a lesser arc in a counter clockwise direction. B represents the melting hearth of the furnace A. The part C represents the blowing hearth of the furnace A, the hearth indicating a series of tuyères as indicated in the drawing. D is a refractory conduit for charging prepared ore, fuel, fluxes, or other ingredients onto the hearth B. E is a guiding and supporting housing for the conduit D which is secured to the furnace A and into which the conduit D may be withdrawn when the furnace A is tilted, or when otherwise desired.

F is a seal for closing the conduit D when desired.

G indicates the pouring and slagging door.

H indicates a chute for conveying desired material into the conduit D.

I indicates a means for elevating and lowering conduit D.

J indicates the blowing system.

K are ports for escape of gangue and other wastes.

L indicates the tilting system.

Having now set forth the physical means through which our invention may be worked we would in practice proceed in producing, for example, a high grade, low carbon (0.15%), steel from a red hematite ore containing not less than fifty per centum of metallic iron as ferric oxide as follows:

Having brought the furnace A up to a proper melting temperature a preliminary metal bath of iron is charged into hearth B by the melting thereon of the requisite scrap, or pig iron into which, when molten, the charger D would be lowered through housing E by means of the controlling mechanism I, until its outlet is just sealed by the bath. Then the conveying means, not shown, is operated to gradually feed the prepared ore through chute H into charger D slowly, building up a column of ore within, and this coincidentally begins to absorb heat, first by conduction from the molten bath itself, and then by conduction through the comparatively thin walls of the refractory charger D until the ore body, becoming plastic under this heat, and with or without flux, builds up by accretions the depth of a bath which is practically wholly composed of molten iron oxide freed from its gangue which separates as a removable slag on the surface of the bath.

When such a stage has been reached the ore feed through chute H is stopped, the door F is closed and the charger D is withdrawn into its housing E, while lime or other fluxes are introduced through charging doors, not shown. It is to be understood that the lime or other flux employed may, if desired, be introduced through charger D subsequent to the stoppage of the ore feed and prior to the withdrawal of the charger D.

Continuing the melting heat for the requisite time to adequately slag the bath, the furnace is then tilted in a counter clockwise direction to draw off the slag through pouring door G, and upon the return of the furnace A to normal level, the blowing system J is started preparatory to receiving the molten bath on the hearth C, when the furnace is thereupon tilted in a clockwise direction through the necessary arc of approximately ninety degrees. Thereupon, by blowing by means of the system J and the resulting moderate oxidation, the impurities of the bath are burned out, after which the bath is returned to the hearth B.

Since now the objective is a mild steel, having approximately 0.15 per cent of contained carbon and since the molten bath at this stage will have present very pure iron oxide, the next step is to reduce this oxide to pure metallic iron by the introduction of suitable coke or other form of carbon onto the hearth B through the charger D.

The blowing system is preferably shut down immediately upon transfer of the molten bath from hearth C to hearth B while coincidentally the charger D is lowered so that the lower end is just immersed in the molten bath, and thereupon conveyors (not shown) are started, feeding carbon of the requisite characteristics into the charger D, whence it will at once fall into and react with or be dissolved by the molten bath containing the ferric oxide, with a resultant liberation of heat.

Ferromanganese may at this stage be introduced into the reduced molten bath to remove any traces of sulphur which might remain after the earlier oxidation blowing.

When this stage of the process has been carried far enough, as may be readily determined by suitable test methods the purified melt may then be tapped, as into a ladle, for example.

If it should be found, in the testing for carbon content in the metal during the reduction of the iron oxide bath, that there is an excess of carbon present above the specification requirements, then it is obvious that the reduced bath should be again returned to the blowing hearth C where such excess carbon would be eliminated by the air blast, before proceeding to obtain the final adjustment according to specifications upon the return of the bath to hearth B.

It is deemed unnecessary to described further herein the production by our invention of ferrous metal compositions and combinations, other than the mild steel already given.

It will be understood that our invention effects a very considerable saving in the total fuel which is required over that demanded by present methods in the production of an equal tonnage of the finished metal, such as mild steel ignots, for example.

By way of example it is well known to us that in our invention, the temporary carburation of the molten bath for the ultimate reduction of the iron oxide present could readily be achieved when this bath is still on the blowing hearth C by passing therethrough suitable atomized hydrocarbons or the vapors therefrom.

As one further illustration of other advantageous manipulations of our invention may be cited our new procedure of introducing alloying, or other beneficial ingredients, into the molten metal when this is on the melting hearth, without subjecting such ingredients to contact with furnace gases, or with the slag, or with the molten iron oxide.

Our method of charging the carbon for the deoxidation of the molten iron departs radically from methods heretofore in use. On the one hand in prevailing processes this reduction would take place on the upper surface of the bath.

While in our process the reducing coke or other carbon is introduced into the stratum of molten iron underneath the iron oxide, hence its carbon tends to be first absorbed into the molten iron stratum heavily carburizing it, while sulphur and other deleterious ingredients are mainly removed with the ash of the reducing agent and with such lime as might have been mixed therewith. The reduction of the iron oxide bath floating on the heavily carburized molten iron stratum takes place therefore at the surface of contact and the carbon monoxide formed there must therefore pass through the entire thickness of the iron oxide bath and hence must bring about further reduction of iron oxide to metallic iron with some conversion of carbon monoxide into carbon dioxide with a resulting overall exothermic reaction.

If the molten bath consisted entirely of iron oxide then charcoal or other sulphur-free reducing carbon would be introduced on starting reduction and would be continued until a depth of molten iron would be formed sufficient to then warrant the introduction of some sulphur-bearing reducing carbon as already described.

While our invention may be practiced when employing only one such typical furnace as shown, yet we clearly recognize the feasibility, and possible desirability under certain conditions, of making use of one major melting furnace fitted with the charger D but without the hearth C and blowing system J and with or without the tilting system L. Under such conditions the function of such furnace would be to feed several minor furnaces similar to that shown in the drawing herein described, wherein the reduction of the iron oxide and the final refinement and metal composition would be provided for and its purification would be carried out.

The charges so fed to the minor furnaces may be either pure molten iron oxide freed from its gangue, or a mixture of such molten iron oxide with molten ferrous metal derived from pig-iron or scrap, melted in the major furnace or in any other furnace.

While we have thus far described our invention as starting with metalliferous ores, we specifically do not limit its operation thereto, since clearly we may add pig iron or scrap, and then having melted this on the hearth B, the further treatment, carburation, alloying or refinement may be carried out just as when making a beginning with metalliferous ores. We even conceive of adding a molten metal of any desired composition procured from any external source supplied to hearth B after which, the remaining operations of our invention may be begun and be carried to completion as already provided for.

Having now disclosed our invention what we claim and desire to secure by Letters Patent is:

1. The process of melting iron oxide ore by feeding said ore into a furnace through a gas-tight refractory conduit immersed in the furnace hot-blast.

2. The process of melting iron oxide ore and, when molten, of the automatic separation of its gangue therefrom by feeding said ore into a furnace through a gas-tight refractory conduit immersed in the furnace hot-blast; said conduit having one end opening external the furnace for ore entrance and having its second end opening internal the furnace beneath the surface of the molten bath discharging there the molten ore; and said conduit having minor peripheral ports adjacent the external surface of the molten bath discharging gangue separating from the melting ore within the conduit.

3. The process of reducing molten iron oxide ore by feeding carbon thereinto through a gas-tight refractory conduit heating said conduit by the furnace hot-blast and sealed against the entry therein of material present during the reaction.

4. The process of producing pure iron oxide by first melting iron oxide ore by feeding said ore into a furnace through a gas-tight refractory conduit immersed in the furnace hot-blast; then, having withdrawn said feeding conduit from the furnace hot-blast. increasing the hot-blast temperature to such a degree as will increase the liquidity of the bath already molten and as will insure the complete separation of all gangue as a removable slag from the molten iron oxide; and then burning out impurities in the molten iron oxide bath by discharging an air-blast therethrough.

5. The process of producing pig-iron by first melting iron oxide ore by feeding said ore into a furnace through a gas-tight refractory conduit immersed in the furnace hot-blast; then, having withdrawn said feeding conduit from the furnace hot-blast, increasing the hot-blast temperature to such a degree as will increase the liquidity of the bath already molten and as will insure the complete separation of all gangue as a removable slag from the molten iron oxide; then burning out impurities in the molten iron oxide bath by discharging an air-blast therethrough; and then, having returned the said feeding conduit into contact with the molten bath and into immersion with the hot-blast, reducing the said purified molten iron oxide by feeding carbon thereinto through said conduit.

6. The process of producing steel by first melting iron oxide ore by feeding said ore into a furnace through a gas-tight refractory conduit immersed in the furnace hot blast; then, having withdrawn said feeding conduit from the furnace hot-blast, increasing the hot-blast temperature to such a degree as will increase the liquidity of the bath already molten and as will insure the complete separation of all gangue as a removable slag from the molten iron oxide; then burning out impurities in the molten iron oxide bath by discharging an air-blast therethrough; then, having returned the said feeding conduit into contact with the molten bath and into immersion with the hot-blast, reducing the said purified molten iron oxide by feeding carbon thereinto through said conduit; and then having eliminated from the bath any excessive carbon, or having supplied to the bath any lacking carbon, to meet metal composition specifications, introducing into said adjusted bath through said feeding conduit any added beneficial or alloying, ingredients metallurgically required.

7. A process of producing iron or steel directly from a charge containing metalliferous ore which comprises melting the charge to produce a bath, adding a suitable amount of flux to the said charge and continuing the melting heat for a requisite time to adequately slag the bath, drawing off the slag from the bath, blowing a gaseous medium into the said bath to moderately oxidize the impurities therein, and thereafter adding carbon to the charge and reducing the iron oxide in the metalliferous ore to metallic iron.

8. An apparatus for the production of iron or steel directly from metalliferous ore which comprises a furnace, a gas-tight refractory conduit, a hot blast for said furnace adapted to heat said refractory conduit, means for feeding ore into said furnace through the said refractory conduit, said conduit having one end opening externally of the furnace to permit feeding of ore therein, and having its other end opening internally of the furnace beneath the surface of the molten bath during operation of the furnace, so as to discharge the ore into said bath and a peripheral port in said conduit adjacent the external surface of said bath adapted to discharge gangue separating from the melting ore within the conduit during the operation of the furnace.

9. An apparatus for the production of iron or steel directly from metalliferous ore which comprises a furnace, a refractory conduit adapted for feeding ore into the said furnace during operation thereof, said refractory conduit having one end thereof positioned to be immersed in a molten charge in the furnace, means for withdrawing the said refractory conduit from the furnace, a blowing hearth containing tuyères, means for tilting said furnace so as to transfer the molten material therein to said blowing hearth and means for withdrawing the slag and metal from the furnace.

10. An apparatus for the production of metal directly from metalliferous ore which comprises a tiltable furnace having a melting hearth, a blowing hearth, a pouring opening or spout, means for tilting the furnace to permit pouring metal or slag from the said opening or spout and to permit transfer of molten metal from the melting hearth to the blowing hearth, a removable charger within the said furnace through which ore can be fed, and means for lifting the said charger from the furnace when the said furnace is tilted.

11. An apparatus for the production of metal directly from metalliferous ore which comprises a tiltable furnace having a melting hearth, a blowing hearth, a pouring opening or spout; means for tilting the furnace to permit pouring metal or slag from the said opening or spout and to permit transfer of molten metal from the said melting hearth to the said blowing hearth; a charger adapted to be positioned within the said furnace for charging ore thereto; a housing connected to the said furnace into which the said charger may be withdrawn from the furnace without interference with the operation of said furnace, and means for withdrawing the said charger into the said housing.

Signed at New York city, in the county of New York and State of New York, this 20th day of February, A. D. 1926.

JAMES G. DUDLEY.
JOHN G. KREER.